United States Patent [19]

Komai et al.

[11] Patent Number: 4,972,893
[45] Date of Patent: Nov. 27, 1990

[54] HIGHLY DURABLE RADIAL TIRES INCLUDING NYLON AND POLYESTER CARCASS PLIES

[75] Inventors: Yukio Komai, Shiga; Eiji Omura, Ibaraki, both of Japan

[73] Assignee: Toyo Tire & Rubber Co., Ltd. (Toyo Gomu Kogyo Kabushiki Kaisha), Osaka, Japan

[21] Appl. No.: 225,008

[22] Filed: Jul. 27, 1988

[30] Foreign Application Priority Data

Jul. 28, 1987 [JP] Japan ................... 62-189896

[51] Int. Cl.$^5$ ............................... B60C 9/02
[52] U.S. Cl. ..................... 152/557; 152/553; 152/564
[58] Field of Search ............ 152/557, 553, 564

[56] References Cited

U.S. PATENT DOCUMENTS

| 4,155,394 | 5/1979 | Shepherd et al. | 152/527 |
| 4,177,852 | 12/1979 | Merli et al. | 152/557 X |
| 4,585,045 | 4/1986 | Morikawa et al. | 152/557 X |
| 4,657,058 | 4/1987 | Kabe et al. | 152/564 X |

FOREIGN PATENT DOCUMENTS 1445642 6/1965 France ................... 152/557

Primary Examiner—Caleb Weston
Assistant Examiner—Geoffrey L. Knable
Attorney, Agent, or Firm—Koda and Androlia

[57] ABSTRACT

Highly durable radial tires, particularly highly durable radial tires having a plurality of carcass plies of organic fiber cords and used for light trucks as well as heavy duty vehicles wherein at least one of the plies is composed of polyamide cords having superior heat resistance in a rubber and the remaining plies or ply are composed of polyester cords.

3 Claims, 1 Drawing Sheet

HIGHLY DURABLE RADIAL TIRES INCLUDING NYLON AND POLYESTER CARCASS PLIES

BACKGROUND OF THE INVENTION

1. Field of the Invention

The present invention relates to an improvement of the carcass structure of a radial tire used for light trucks as well as heavy duty vehicles such as trucks, buses and so forth.

2. Prior Art

A radial tire is superior in wear resistance and low rolling resistance and has been often used for light trucks or heavy duty vehicles.

There have been used some carcass structures, for example, (1) a plurality of carcass plies being turned up around a bead wire from the inside to the outside; (2) some carcass plies (inner plies) being turned up around a bead wire from the inside to the outside and remaining plies(outer plies) covering the turn-up portions of the inner plies and terminating radially inwardly of the bead wire; and so forth. As being well known, polyester cords have been recommended for carcass cord materials in view of the superiority in rust prevention and strength as well as lightness.

Radial tires either for light trucks or for heavy duty vehicles are comparatively superior in durability because of their good properties in wear resistance and low rolling resistance. In case, however, high heat generation is experienced in tire during consecutive tire running under a heavy load or with frequent braking, organic fiber cords such as polyester cords deteriorate by heat so that there occurred the problems such as deterioration in breaking strength or peeling adhesion as well as remarkable deterioration in durability owing to internal breakage of the cords or occurrence of ply separation.

SUMMARY OF THE INVENTION

It is therefore an object of the present invention to provide highly durable radial tires, particularly highly durable radial tires having a plurality of carcass plies of organic fiber cords, which have an improved total durability by solving the problems of heat performance while maintaining the good properties in wear resistance, low rolling resistance and so forth of radial tires.

In order to accomplish the above objects, radial tires in accordance with the present invention include different kinds of organic fiber cords having different heat performance in a rubber. Namely the present invention provides radial tires having a plurality of carcass plies of organic fiber cords wherein at least one of the plies is composed of different cord materials having different heat polyamide cords having superior heat resistance in a rubber in comparsion with cord materials of the remaining plies.

The combination of organic fiber cords is preferred to be polyamide cords and polyester cords.

For example, carcass structure are preferably composed as follows; (1) all carcass plies being turned up around a bead wire from the inside to the outside wherein carcass plies disposed axially inwardly include polyamide cords such as nylon or aramid and carcass plies disposed axially outwardly include polyester cords, (2) inner carcass plies turned up around a bead wire from the inside to the outside including polyester cords and outer carcass plies, covering the turn-up portions of the inner plies and terminating radially inwardly of the bead wire, including nylon cords.

Topping rubbers for carcass plies are preferred to be rubber compounds of 30 to 70 kg/cm at 100% modulus.

When the radial tires having a plurality of carcass plies of organic fiber cords include not only polyester cords but also polyamide cords superior in heat performance such as heat resistance, heat-proof adhesion, the deterioration problems in breaking strength and peeling strength caused by tire heat build-up can be improved a lot, so highly durable radial tires can be provided.

DETAILED DESCRIPTION OF THE INVENTION

Figure 1:
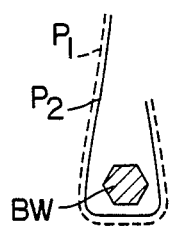
FIG. 1 represents a schematic view of a carcass structure showing one embodiment of the present invention.
Figure 2:
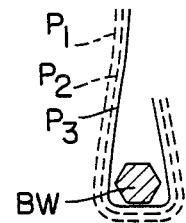
FIG. 2 is a schematic view of a carcass structure showing another embodiment of the present invention.

In the attached drawings, shown in FIG. 1 and FIG. 2 are the embodiments of radial tires in accordance with the present invention wherein all carcass plies are turned up around a bead wire BW from the insede to the outside. In FIG. 1, the embodiment tire (Tire No. I) is illustrated wherein the first carcass ply P1 counted from the inside of the tire is made of aramid cords and the second carcass ply P2 is made of polyester cords. In FIG. 2, the embodiment tire (Tire No. II) is illustrated wherein the first carcass ply and the adjacent second carcass ply counted from the inside of the tire are made of nylon cords and the third carcass ply P3 is made of polyester cords.

Figure 3:
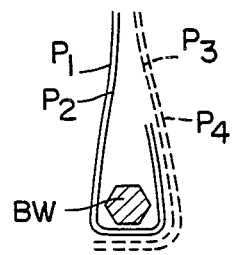
FIG. 3 is a schematic view of a carcass structure showing still another embodiment of the present invention.
Figure 4:
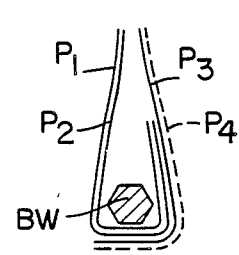
FIG. 4 is a schematic view of a carcass structure showing further embodiment of the present invention.

Shown in FIG. 3 and FIG. 4 are further embodiments of radial tires in accordance with the present invention which have four carcass plies. The first and second carcass plies(inner plies) P1, P2 are turned up around the bead wire BW from the inside to the outside. The outer two plies, i.e. the third and fourth carcass plies(outer plies) P3, P4 cover the turn-up portions of the first and second carcass plies and terminate radially inwardly of the head wire BW. The inner plies P1, P2 are made of polyester cords both in FIG. 3 and FIG. 4. The outer plies P3, P4 are made of nylon cords in FIG. 3(Tire No. III). In FIG. 4, the fourth outer ply(outermost ply) is made of nylon cords and the third outer ply is made of polyester cords(Tire No. IV).

Figure 5:
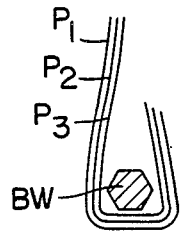
FIG. 5 and FIG. 6 are schematic views of conventional carcass structures.
Figure 6:
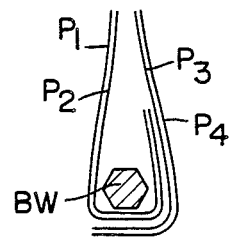

Shown in FIG. 5 and FIG. 6 are conventional radial tires wherein all carcass plies are made of polyester cords. In FIG. 5, all carcass plies P1, P2, P3 are turned up around the bead wire BW from the inside to the outside(Tire No. V). In FIG. 6, inner plies P1, P2 are turned up around the bead wire BW from the inside to the outside and outer plies P3, P4 cover the turn-up portions of the inner plies and terminate radially inwardly of the bead wire BW (Tire No. VI).

Heavy duty radial tires 10.00 R 20 were prepared for the purpose of conducting comparative tests of Tire Nos. I to VI. Test results are shown in the following table.

In the Table, performance tests were conducted as follows.

Hydrostatic test after aging

Water pressure burst strength after aging was tested as follows.

160° C. steam was introduced into the bead portions through a steam pipe connected to the bead portions of the tires mounted on rims. After heat deterioration, water was introduced into the tires with increasing water pressure. Then the water pressure was measured at tire burst. The values are indicated in the form of an index by setting the values of conventional tires (Tire Nos. V and VI) to be 100.

Endurance test

Drum tests were conducted in accordance with the durability test conditions specified in section 119 of FMVSS (Federal Motor Vehicle Safety Standard). No failures being observed after completing a test stage, drum tests were continued with the addition of 270 kg loads at every 24 hours until tire failures occured. The values are indicated in the form of an index by setting the values of conventional tires to be 100.

Fatigue resistance of cords

After 100,000 km actual running, the tires were disassembled to measure the breaking strength of of cords using Autograph by Shimadzu Seisakusho Ltd. and strength retention coefficients were evaluated before and after running. The values were indicated in the form of an index.

Ply ashesion

After 100,000 km actual running, the tires were disassembled to measure the peeling strength of ply to ply using Autograph by Shimadzu Seisakusho Ltd. and adhesion retention coefficients were evaluated before and after running. The values were indicated in the form of an index.

As apparent from the following table, Embodiments Tire Nos. I, II, III and IV in accordance with the present invention solve the probelms in heat performance by employing a plurality of carcass plies made with different organic fiber cords, more precisely, by employing polyamide cords for at least one of the plies and employing polyester cords for the remaining plies. They are superior in the high load bearing properties and ply adhesion compared with Conventional Tire Nos. 5 and 6 wherein all the carcass plies are consititued of the same organic fiber cords. Thus, highly durable radial tires can be provided in accordance with the present invention.

| Tire No. | EMBODIMENTS I | | | EMBODIMENTS II | | | CONVENTIONAL V | | |
|---|---|---|---|---|---|---|---|---|---|
| Carcass plies | | | | | | | | | |
| 1st ply | aramid 1500D/2 | | | nylon 1890D/2 | | | polyester 1500D/3 | | |
| 2nd ply | polyester 1500D/3 | | | nylon 1890D/2 | | | polyester 1500D/3 | | |
| 3rd ply | — | | | polyester 1500D/3 | | | polyester 1500D/3 | | |
| 4th ply | — | | | — | | | — | | |
| *hydrostatic test after aging | 180 | | | 175 | | | 100 | | |
| *endurance test | 125 | | | 120 | | | 100 | | |
| *fatigue resistance of cords | 1: 105 | 2: 100 | | 1: 120 | 2: 130 | 3: 100 | 1: 100 | 2: 100 | 3: 100 |
| *ply adhesion | 1~2: 135 | | | 1~2: 150 | 2~3: 105 | | 1~2: 100 | 2~3: 100 | |

| Tire No. | EMBODIMENTS III | | | | EMBODIMENTS IV | | | | CONVENTIONAL VI | | | |
|---|---|---|---|---|---|---|---|---|---|---|---|---|
| Carcass plies | | | | | | | | | | | | |
| 1st ply | polyester 1500D/2 | | | | polyester 1500D/2 | | | | polyester 1500D/2 | | | |
| 2nd ply | polyester 1500D/2 | | | | polyester 1500D/2 | | | | polyester 1500D/2 | | | |
| 3rd ply | nylon 1260D/2 | | | | polyester 1500D/2 | | | | polyester 1500D/2 | | | |
| 4th ply | nylon 1260D/2 | | | | nylon 1260D/2 | | | | polyester 1500D/2 | | | |
| *hydrostatic test after aging | 145 | | | | 130 | | | | 100 | | | |
| *endurance test | 120 | | | | 110 | | | | 100 | | | |
| *fatigue resistance | 1: 105 | 2: 100 | 3: 135 | 4: 125 | 1: 110 | 2: 105 | 3: 95 | 4: 135 | 1: 100 | 2: 100 | 3: 100 | 4: 100 |

| | | | | | | |
|---|---|---|---|---|---|---|
| of cords | | | | | | |
| *ply | 1~2 | 3~4 | 1~2 | 3~4 | 1~2 | 3~4 |
| adhesion | 105 | 140 | 110 | 130 | 100 | 100 |

We claim:

1. Highly durable radial tires comprising a plurality of carcass plies of organic fiber cords wherein at least two adjacent inner plies which are disposed axially inwardly at the inside of a bead wire are composed of nylon cords and at least one outer ply which is disposed axially outwardly of said at least two adjacent inner plies at the inside of the bead wire is composed of polyester cords and all of said carcass plies are turned up around the bead wire from the inside to the outside and terminate radially outwardly of the bead wire.

2. Highly durable radial tires comprising a plurality of carcass plies of organic fiber cords wherein two inner plies are composed of polyester cords and two outer plies are composed of nylon cords, said inner plies being turned up around a bead wire from the inside to the outside and terminate radially outwardly of the bead wire and said outer plies being turned around the bead wire from the outside to the inside covering a turn-up portion of the inner ply and terminating radially inwardly of the bead wire covering the inner plies at the radially inward portion of the bead wire.

3. Highly durable radial tires as claimed in claim 1 or 2, wherein topping rubbers for said carcass plies are of 30–70 kg/cm at 100% modulus.

* * * * *